(12) United States Patent
Diao et al.

(10) Patent No.: US 6,476,100 B2
(45) Date of Patent: Nov. 5, 2002

(54) SOLID SURFACE MATERIALS PREPARED FROM EXTRUDABLE ACRYLIC COMPOSITES

(75) Inventors: Beibei Diao, Wilmington, DE (US); Thomas Robert Darling, Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/775,987

(22) Filed: Feb. 2, 2001

(65) Prior Publication Data

US 2002/0137829 A1 Sep. 26, 2002

(51) Int. Cl.[7] .................. C08L 63/10; C08K 3/26; C08G 59/14
(52) U.S. Cl. .................. 523/401; 524/425; 525/533
(58) Field of Search .................. 525/533; 524/425; 523/401

(56) References Cited

U.S. PATENT DOCUMENTS

| 3,752,870 A | | 8/1973 | Labana |
| 3,876,587 A | | 4/1975 | Matsui et al. |
| 4,346,144 A | | 8/1982 | Craven |
| 5,266,651 A | * | 11/1993 | Foss et al. |
| 6,028,127 A | * | 2/2000 | Yanagase et al. |

* cited by examiner

*Primary Examiner*—Tae H. Yoon

(57) ABSTRACT

Solid surface material is prepared from an extrudable composite material comprising a matrix of at least one acrylic resin and a filler dispersed in the matrix, said acrylic resin comprising an acrylic epoxy-ftmctional copolymer as a matrix resin crosslinked with a straight or branched chain aliphatic carboxylic acid or anhydride of such acid.

6 Claims, No Drawings

SOLID SURFACE MATERIALS PREPARED FROM EXTRUDABLE ACRYLIC COMPOSITES

FIELD OF THE INVENTION

This invention is directed to producing thin sheets of extrudable acrylic compositions for solid surface applications having desired physical properties. More particularly, the invention is directed to improving the heat resistance of such materials.

DESCRIPTION OF THE RELATED ART

Artificial (or synthetic) marble can be considered as a general designation for various types of materials used as building products, such as bathroom vanity tops, sinks, shower stalls and kitchen counter tops, for example; furniture; sanitary use; lining materials; and stationary small articles. Artificial marbles encompass cultured marble, onyx and solid surface materials typically comprising some kind of resin matrix and either with or without a filler present in the resin matrix. Solid surface materials are typically filled resin materials. Corian®, sold by E. I. du Pont de Nemours and Company, Wilmington, Del., (DuPont), is a solid surface material comprising an acrylic matrix filled with alumina trihydrate (ATH).

While the prior art discloses many polymeric compositions containing fillers for various purposes, the solid surface market is non-differentiated with respect to heat resistance, and the problem of improving heat resistance has not been adequately addressed. Such compositions are not readily extrudable to form thin sheet material.

SUMMARY OF THE INVENTION

In accordance with this invention there is provided solid surface material having improved heat resistance. The solid surface material comprises a crosslinked acrylic composite as a matrix and at least one filler dispersed in the matrix. In a preferred embodiment the matrix is selected from an epoxy functional copolymer such as poly (methyl methacrylate/ glycidol methacrylate) and a diacid as the crosslinking agent. The filler is calcium carbonate or another filler commonly disclosed in the art. The compositions of this invention are readily extrudable to form thin sheet material which has high heat resistance.

DETAILED DESCRIPTION OF THE INVENTION

This invention comprises acrylic composites that can be extruded into thin sheets, which are thermoformable, have high heat resistance and resistance to staining. Acrylic resins useful in the present invention are not specially limited as long as they include a cross-linkable component and can be formed into an acrylic solid surface material. Examples of useful acrylic resins include various kinds of conventional acrylic monomers, acrylic oligomers, vinyl monomers for copolymerization other than acrylic monomers, or oligomers. As the acrylic monomer, (meth)acrylic ester is preferred. Examples of (meth)acrylic ester include methyl (meth)acrylic ester, ethyl(meth)acrylic ester, butyl (meth) acrylic ester, 2-ethylhexyl (meth)acrylic ester, and benzyl (meth)acrylic ester. The acrylic resin has an epoxy functionality provided by copolymerization of the acrylic component with from about 8 to 35% by weight of glycidyl methacrylate, preferably from 10 to 20% by weight of glycidyl methacrylate, based on the weight of the acrylic resin.

The acrylic polymer matrix is crosslinked using a straight or branched chain, aliphatic dicarboxylic acid such as adipic, pimelic, suberic, azelaic, sebacic, undecanoic, and 1,12-dodecandioic acid in an amount from about 7 to 15% by weight of the acrylic polymer. Also useful are anhydrides of the acids such as decanedicarboxylic acid anhydride.

The ingredients are mixed at a low temperature to prevent cross linking, for example on a roll mill at temperatures from 75° to 140° C., extruded and thereafter cross linked at temperatures of 170° to 210° C. As just described cross linking can be accomplished by heating the reactants to a temperature above about 170° C. or by the addition of a small amount of a catalyst to speed up the reaction such as dibutyltin dilaurate or methyltriphenylphosphonium bromide in amounts from 0.05 to 1% by weight of the total mixture. Fillers useful in the present invention include, for example, calcium carbonate, barium sulfate, aluminum oxide, magnesium hydroxide, kaolin, or decorative agents, as a list that is not exhaustive and not intended to limit the invention. Fillers can be present in effective amounts from as low as about 20% by weight to about 75% by weight. Preferably, amounts from 30 to 60% by weight are used.

It is known to include in solid surface materials other additives such as pigments, dyes, flame retardant agents, parting agents, fluidizing agents, viscosity control agents, curing agents, antioxidants, toughening agents and color inhibitors. Additives to provide simulated granite are disclosed in U.S. Pat. No. 4,085,246.

Solid surface materials of this invention can be prepared by a continuous extrusion process using a multi-feeder twin-screw extruder equipped with vacuum and a sheet die of proper dimensions. The extruded sheets can be directly transferred either onto a double belt press or into an oven for curing. Light pressure may be needed for maintaining sheet gauge or profile during curing. The resulting solid surface material is thermoformable, i.e. reshapeable under controlled conditions of temperature and force which is useful in building product applications.

Heat Resistance Test Method

Heat resistance is determined by a "hot block test". A metal block (a 800 g stainless steel cylinder of 2 inches (5.08 cm) diameter and 1⅞ inches (4.76 cm) height is heated with and internal cartridge heater and its temperature is controlled by a temperature controller. In the Examples below thin samples (thickness less than ¼ inch (0.6 cm) are laminated onto ¾ inch (1.9 cm) particle boards before the test. The metal block, which is heated to and maintained at a desired temperature (±2° C.), is placed on a sample surface for 5 minutes. The sample surface is then inspected for any visible (qualitative) change with an unaided eye. If a tested surface with a subtle surface change can still be refinished to the original look using light sanding, the sample is considered "Pass" at the test temperature.

Additional features of the invention are illustrated by the following Examples, in which parts and percentages are by weight unless otherwise indicated.

EXAMPLES 1–15

Acrylic composites having compositions specified in Table 1 which follows were prepared by compounding the resins, fillers and additives on a 2 inch (5.08 cm) two-roll (can be various dimensions) mill at temperatures between 75 and 140° C. The particular temperature was selected so that no crosslinking reaction would take place within the processing time frame. The compounded materials were placed in a press at 170–210° C. for the crosslinking reaction.

The examples demonstrate that the epoxy-acid crosslink system of this invention dramatically improve the heat resistance of the acrylic compositions. The surface of some materials does not exhibit swelling or blistering even at 300° C. using the hot block test. Most of the yellowed surfaces after a hot block test at 270° C. can still be refinished by light sanding to their original color. For comparison, a 50% CaCO$_3$ filled homo-polymethylmethacrylate of molecular weight 100,000 (weight average) composite, made by a conventional extrusion process, exhibited severe surface blistering and melting under the hot block test at 180° C.

DDDA=1.12-Dodecanedioic acid; Almatex PD9200=Co-poly(MMA/22%GMA) mw~11000–15000 (Anderson Development Co.); Almatex 6100=Co-poly(MMA/I5%GMA) mw~12000–15000 (Anderson Development Co.); T12=Dibutyltin dilaurate (Air Products Co.); Irganox® (Ciba Geigy Corp.) 1076=Octadecyl 3,5-di-tert-butyl-4-hydroxyhydrocinnamate; IRGAFOS® 168(Ciba Geigy Corp.)=Tris(2,4-di-tert-butylphenyl)phosphite; SS-Crunchie=Corian® ground particles (DuPont Corian®); ATH=Aluminum Trihydrate (Alcoa); MMA=methylmethacrylate; GMA=glycidyl methacrylate.

What is claimed is:

1. An extruded sheet of a filled acrylic solid surface material comprising a matrix of at least one acrylic resin and a filler dispersed in the matrix, said acrylic resin comprising an acrylic polymer having an epoxy-functionality said polymer being crosslinked by a straight or branched chain aliphatic carboxylic acid or anhydride of such acid wherein said acrylic polymer comprises poly(methylmethacrylate/glycidyl methacrylate).

TABLE 1

Heat Resistance Data of Representative Examples

Formulation (percent on total weight)

| # | Polymer | Crosslinker | Filler | Catalyst & Additive | Hot Block Test Observation |
|---|---|---|---|---|---|
| 1 | 40% RCP28170 | 20% VXL1381 | 40% CaCO3-8105C | 0.08% MTPPB | 200° C. - yellowing; no swelling; no blistering |
| 2 | 40% RCP28170 | 20% VXL1381 | 40% Talc 9101 | 0.12% MTPPB | 230° C. - yellowing; no swelling; no blistering |
| 3 | 43% RCP28170 | 6.5% DDDA | 50% CaCO3-8105C | 0.09% T12 | 250° C.-yellowing; no Swelling; no blistering |
| 4 | 6% Almatex PD9200 | 3.5% DDDA | 50% CaCO3-8105C | 0.05% T12 | 250° C. - light yellowing; no swelling; no blistering |
| 5 | 46% Almatex PD9200 | 3.5% DDDA | 50% CaCO3-8105C | 0.05% T12; 0.05% IRGAFOS168 | 250° C. - very light yellowing; no swelling; no blistering |
| 6 | 6% Almatex PD9200 | 3.5% DDDA | 50% CaCO3-8105C | 0.05% T12; 0.05% IRGANOX 1076 | 250° C. - almost invisible yellowing; no swelling; no blistering |
| 7 | 39% Almatex PD9200 | 2.9% DDDA | 58% ATH | 0.05% IRGANOX 1076 | 220° C. - no visible change |
| 8 | 33% Almatex PD9200 | 2.4% DDDA | 51% ATH; 14% SSChrunchie | 0.05% IRGANOX 1076 | 220° C. - no visible change |
| 9 | 7% Almatex PD9200 | 2.8% Adipic Acid | 50% CaCO3-8105C | 0.05% T12 | 270° C. - light yellowing; no swelling; no blistering |
| 10 | 47% RCP28170 | 3.8% Adipic Acid | 49% CaCO3-8105C | 0.05% T12 | 200° C. - light swelling; internal air bubbling; no Blistering |
| 11 | 48% Almatex PD9200 | 3.0% DDDA | 49% CaCO3-8105C | 0.05% IRGANOX 1076 | 270° C. - light yellowing; no swelling; no blistering |
| 12 | 47% Almatex PD6100 | 3.9% DDDA | 49% CaCO3-8105C | | 250° C. - light yellowing; no swelling; no blistering |
| 13 | 48% Almatex PD6100 | 2.1% Adipic Acid | 50% CaCO3-8105C | — | 230° C. - swelling; internal air bubbling; no blistering |
| 14 | 45.5% RCP28222 | 4.5% DDDA | 50% CaCO3-81O5C | | 200° C. - swelling; internal air bubbling; inhomogeneous |
| 15 | 46% RCP28222 | 3.0% Adipic Acid | 51% CaCO3-8105C | | 200° C. - swelling; internal air bubbling; inhomogeneous |

In the table above the various words and codes have the following meanings: RCP28170=copoly(MMA/22%GMA) mw~11,000–15,000; RCP 28222=Co-poly(MMA/10%GMA) mw~8000; VXL1381=decanedicarboxylic acid anhydride (Hoechst Co.); MTPPB=methyltriphenylphosphonium bromide (Aldrich Co.);

2. The extruded sheet of claim 1 wherein said dicarboxylic acid is a straight chain aliphatic crosslinker.

3. The extruded sheet of claim 1 wherein said filler is calcium carbonate.

4. The extruded sheet of claim 1 wherein said acrylic polymer is comprised of 65 to 92% by weight of methylmethacrylate and 8 to 35% by weight glycidyl methacrylate.

5. The extruded sheet of claim 4 wherein the filler is present in an amount from 20 to 75% by weight based on the total weight of the material.

6. The extruded sheet of claim 4 wherein said copolymer is crosslinked by 1,12-dodecanedioic acid.

* * * * *